(12) United States Patent
Liu et al.

(10) Patent No.: US 12,333,530 B2
(45) Date of Patent: Jun. 17, 2025

(54) CROSS DOMAIN KEY MANAGEMENT

(71) Applicant: Coinbase, Inc., Oakland, CA (US)

(72) Inventors: Yolanda Liu, Boston, MA (US);
Leonardo D. M. Machado, London (GB); Pavel Zakharov, Montreal (CA); Roman Popenov, Salem, NH (US); Larry Liu, Kendall Park, NJ (US); Brian Ko, Fremont, CA (US)

(*) Notice: Subject to any disclaimer, the term of this patent is extended or adjusted under 35 U.S.C. 154(b) by 148 days.

(21) Appl. No.: 18/228,594

(22) Filed: Jul. 31, 2023

(65) Prior Publication Data

US 2025/0045742 A1 Feb. 6, 2025

(51) Int. Cl.
G06Q 20/38 (2012.01)
G06Q 20/02 (2012.01)
H04L 25/26 (2006.01)

(52) U.S. Cl.
CPC ......... G06Q 20/3829 (2013.01); G06Q 20/02 (2013.01); G06Q 20/3825 (2013.01); H04L 25/26 (2013.01)

(58) Field of Classification Search
CPC ............... G06Q 20/3829; G06Q 20/02; G06Q 20/3825; H04L 25/26
USPC .......................................................... 705/75
See application file for complete search history.

(56) References Cited

U.S. PATENT DOCUMENTS

| | | | | |
|---|---|---|---|---|
| 12,211,032 | B2* | 1/2025 | Shamai | G06Q 20/3674 |
| 2020/0356989 | A1* | 11/2020 | Shamai | H04L 9/0833 |
| 2021/0049591 | A1* | 2/2021 | Lamesh | G06Q 20/3276 |
| 2021/0067345 | A1* | 3/2021 | Shamai | H04L 9/085 |
| 2022/0021521 | A1* | 1/2022 | Shamai | G06Q 20/3676 |
| 2022/0327530 | A1* | 10/2022 | Pagter | H04L 9/50 |
| 2023/0281606 | A1* | 9/2023 | Jakobsson | G06Q 20/3674 |
| | | | | 705/67 |
| 2023/0327859 | A1* | 10/2023 | Stern | H04L 9/14 |
| | | | | 380/45 |
| 2024/0346481 | A1* | 10/2024 | Liu | G06Q 20/4014 |

OTHER PUBLICATIONS

Jaroucheh et al. "Crypto Assets Custody: Taxonomy, Components, and Open Challenges", 2023 IEEE International Conference on Blockchain and Cryptocurrency, Jun. 17, 2023, 6 pages (Year: 2023).*

(Continued)

*Primary Examiner* — James D Nigh
(74) *Attorney, Agent, or Firm* — Holland & Hart LLP

(57) ABSTRACT

Methods, systems, and devices for data management are described. A datacenter may include one or more servers and an offline key storage system. The datacenter may receive, via a server and from a multi-party computation (MPC) coordinator, a first request to access a key share associated with an MPC node. The server may transmit a second request for the key share associated with the MPC node via a first cross domain communication path to an offline key storage system. The offline key storage system may verify a digital signature included with the second request. The offline key storage system may transmit a response including the key share that is encrypted using an encryption key associated with the MPC node to the server via a second cross domain communication path. The server may transmit a communication including the encrypted key share to the MPC coordinator.

20 Claims, 9 Drawing Sheets

(56) References Cited

OTHER PUBLICATIONS

"Fireblocks Issues Public Comment to Commerce Dept.", Jul. 11, 2022, 5 pages (Year: 2022).*

Nasdaq OMX™ GlobeNewswire, "Curv Air Gap Debuts, Expands Digital Asset Security for eToro with Math Breakthrough: MPC Tech Allows Institutions to Sign Transactions Offline, Adapt to Regulations and Solve Security Risks of Cold Wallets", Apr. 23, 2020, 2 pages (Year: 2020).*

* cited by examiner

CROSS DOMAIN KEY MANAGEMENT

FIELD OF TECHNOLOGY

The present disclosure relates generally to data management, including techniques for cross domain key management.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Various types of wallets may be used to interact with blockchain networks. For example, hot wallets, cold wallets, hardware wallets, wallet applications, browser wallets, or the like may be used to interact with blockchain networks to perform one or more blockchain functions (e.g., transfer of tokens). Cold wallets may refer to assets stored in an offline system for storing private keys where the assets may not be connected (e.g., directly or indirectly) to the internet. Human interaction may occur (e.g., be required) to access cold wallets, perform operations (e.g., sign transactions), or both. For example, a human may perform a connection (e.g., "Sneakernet") between an offline key storage and an online system (e.g., via external media such as a USB, CD, etc.) after receiving a request to sign a transaction. As such, cold wallets using human interaction may be associated with a longer transaction time (e.g., as opposed to other wallet types). Further, cold wallets may be indirectly connected to the internet, or, at least, difficult to confirm as not being connected to the internet.

As described herein, a cross domain solution (CDS) may be implemented for a cryptographic transaction to isolate a system from the internet and offer a shorter transaction time (e.g., as opposed to human operation). A key management system may include one or more online components and one or more offline components which interact via the CDS to receive, filter, and respond to requests to sign transactions via a key share stored in an offline key storage of the offline components. For example, an offline server may filter the requests according to one or more identifiers associated with the requests such that requests received from authorized users pass through to an offline key share storage system. The offline server may respond to the request with an encrypted key share. For example, the offline key share storage system may respond to the request with a key share encrypted such that the key share is usable by an intended receiver (e.g., encrypted with the public key associated with the intended receiver).

Implementation of the CDS in a key management system may improve security by ensuring that the offline server and offline key share storage system are inaccessible and unconfigurable via the internet. For example, the CDS may be implemented such that the offline components are configurable via physical access. Further, the CDS may improve security by allowing specific message types (e.g., request messages or response messages) to be transmitted between the offline components and the online components.

Figure 1:
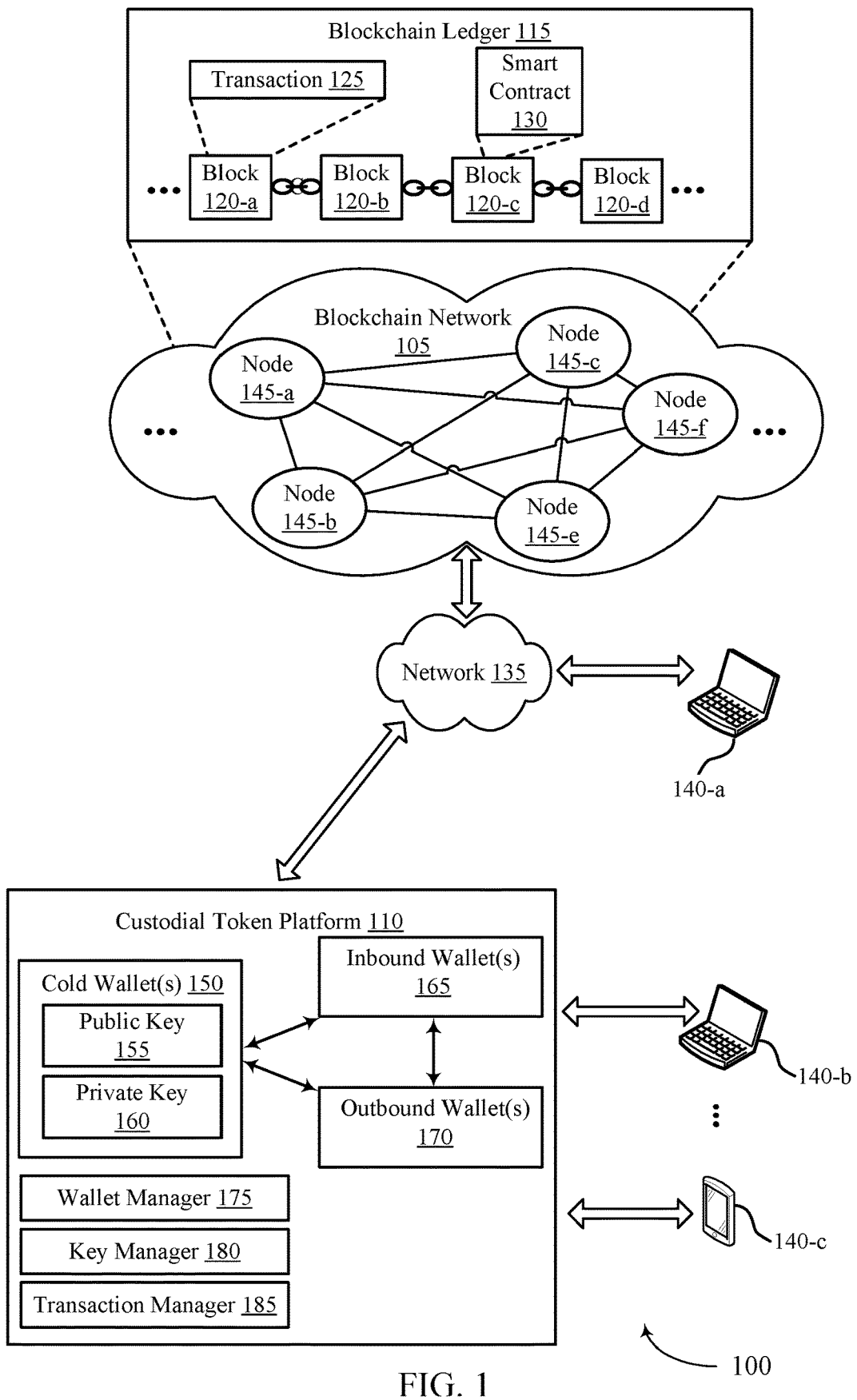
FIG. 1 illustrates an example of a computing environment that supports cross domain key management in accordance with aspects of the present disclosure.

FIG. 1 illustrates an example of a computing environment 100 that supports cross domain key management in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, non-fungible tokens (NFTs), and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a subprogram that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the custodial token platform 110, the blockchain network 105, or both. For example, a user of the computing device 140-*a* may provide user inputs via the computing device 140-*a*, which may result in commands, data, or any combination thereof being communicated via the network 135 to the custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols support layer one and layer two crypto tokens. A layer one token is a token that is supported by its own blockchain protocol, meaning that the layer one token (or a derivative thereof), may be used to pay transaction fees for transacting using the blockchain protocol. A layer two token is a token that is built on top of layer one, for example, using a smart contract 130 or a decentralized application ("Dapp"). The smart contract 130 or decentralized application may issue layer two tokens to various users based on various conditions, and the users may transact using the layer two tokens, but transaction fees may be based on the layer one token (or a derivative thereof).

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160, which may be stored and managed by the key manager 180, as described herein. The public key 155 may be used to publicly transact via the cold wallet 150, meaning that another wallet may enter the public key 155 into a transaction such as to move assets from the wallet to the cold wallet 150. The private key 160 of the key manager 180 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital asset between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to cause transfer of tokens from a wallet managed by the custodial token platform 110 to an external wallet, to deploy a smart contract (e.g., a self-executing program), or to call a smart contract.

In some examples, various types of wallets may be used to interact with the blockchain network 105. For example, hot wallets, cold wallet(s) 150, hardware wallets, wallet applications, browser wallets, or the like may be used to interact with the blockchain network 105 to perform one or more blockchain functions (e.g., transfer of tokens). The cold wallet(s) 150 may refer to an offline system for storing private keys wherein the system (and corresponding assets) may not be connected (e.g., directly or indirectly) to the internet. Human interaction may occur (e.g., be required) to access the cold wallet(s) 150, perform operations (e.g., sign transactions), or both. As such, the cold wallet(s) 150 may be associated with a longer transaction time (e.g., as opposed to other wallet types) and higher security. For example, a human may perform a connection (e.g., "Sneakernet") between an offline key storage and an online system (e.g., via external media such as a USB, CD, etc.) after receiving a request to sign a transaction. Further, the cold wallet(s) 150 may be indirectly connected to the internet, or, at least, difficult to confirm as not being connected to the internet.

As described herein, a cross domain solution (CDS) may be implemented for a cryptographic transaction to isolate a system from the internet and offer a shorter transaction time (e.g., as opposed to human operation) while increasing or maintaining security associated with cold wallets. A key management system may include one or more online components and one or more offline components which interact via the CDS to receive, filter, and respond to requests to sign transactions via a key share stored in an offline key storage of the offline components.

Figure 2:
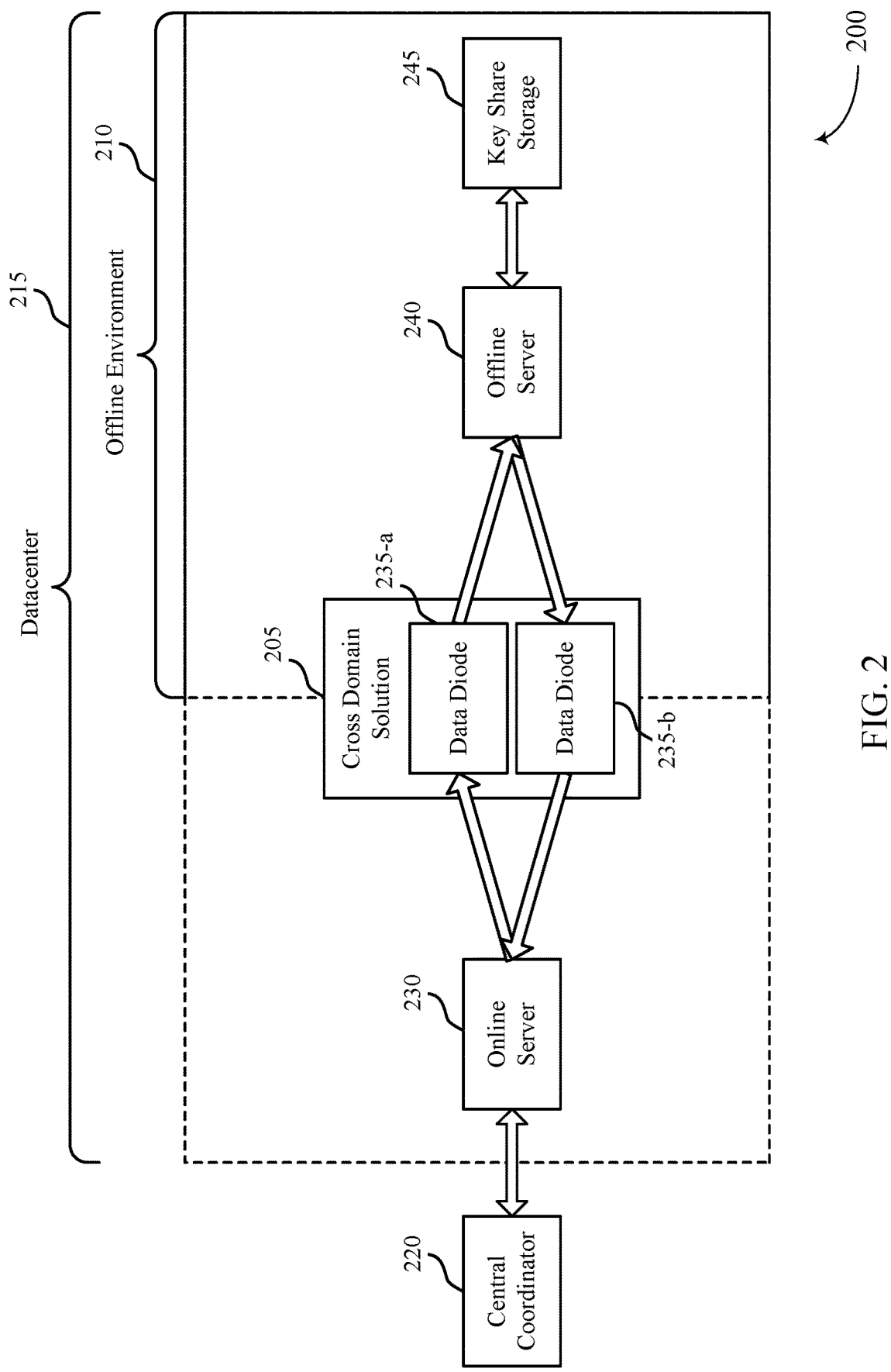
FIG. 2 shows an example of a computing environment that supports cross domain key management in accordance with aspects of the present disclosure.

FIG. 2 shows an example of a computing environment 200 that supports cross domain key management in accordance with aspects of the present disclosure. The computing environment 200 may include a central coordinator 220, which may receive one or more inputs from a computing device 140 as described with reference to FIG. 1. Additionally, or alternatively, the computing environment 200 may include a CDS 205 which may be implemented to securely access one or more key shares of a private key 160 as described with reference to FIG. 1.

The CDS 205 may refer to an integrated hardware and software system which enables isolation of a segregated system domain from an online environment. The CDS 205 may include one or more data diodes (e.g., a data diode 235-*a* and a data diode 235-*b*) which each permit specific types of transmissions in specific directions. For example, the CDS 205 may include a first physical path (e.g., of the data diode 235-*a*) through which a first data type (e.g., requests) may be transmitted, as well as a second physical path (e.g., of the data diode 235-*b*) through which a second data type (e.g., responses) may be transmitted. The first data type, the second data type, or both may be changed (e.g., reconfigured) via physical access to the hardware (e.g., one or more ports) of the CDS 205. That is, the types of data permitted to be transmitted through the CDS 205 may be configurable (e.g., only configurable) via physical access to the CDS 205 (e.g., as opposed to via a network or online server).

The data diode 235-*a*, the data diode 235-*b*, or both may include, for example, light emitting diodes (LEDs) and fiber-optic cables wherein light is emitted by a first LED in the first direction via the first physical path (e.g., a first fiber-optic cable) and by a second LED in the second direction via the second physical path (e.g., a second fiber-optic cable). In some examples, the data diode 235-a, the data diode 235-b, or both may transmit encrypted messages such that the messages may be decrypted by an intended receiver. As such, the CDS 205 may enable (e.g., via hardware) a secure access procedure for an isolated system domain.

As described herein, the CDS 205 may be used in the computing environment 200 to enable secure access to one or more key shares stored in a key share storage 245 of an offline environment 210. For example, the CDS 205 may isolate the offline environment 210 from an online environment (e.g., a cloud) via hardware, such as the data diode 235-a, the data diode 235-b, or both. The data diode 235-a may be configured to transfer requests (e.g., requests for key shares of the key share storage 245) from an online server 230 to an offline server 240 (e.g., in the first direction). Additionally, or alternatively, the data diode 235-b may be configured to transfer responses (e.g., an encrypted key share of the key share storage 245) from the offline server 240 to the online server 230 (e.g., in the second direction).

In some examples, the requests may be for access to a key share associated with a multi-party computation (MPC) node, where the key share is stored in an offline key storage system (e.g., the key share storage 245). Additionally, or alternatively, the response may be a communication including the key share (e.g., the requested key share), where the key share may be encrypted using an encryption key associated with the MPC node.

A central coordinator 220 may transmit one or more requests to the online server 230. In some examples, the central coordinator 220 may be an MPC coordinator that performs operations for MPC functionality, such as coordinating requests/responses to various MPC nodes to perform an operation.

In some examples, the online server 230 may transmit, via the data diode 235-a, encrypted requests to the offline server 240. For example, the online server 230 may encrypt the requests such that a key share (e.g., a specific key share) of the key share storage 245 may be used to decrypt the request. Additionally, or alternatively, the data diode 235-b may transfer a communication to the online server 230 including an encrypted key share. For example, the key share may be encrypted by a public key of an MPC node associated with the key share.

The online server 230, the offline server 240, or both may filter requests received from the central coordinator 220. For example, the online server 230, the offline server 240, or both may determine if one or more requests are received from an authorized party (e.g., user, system, etc.). That is, a key share may be associated with one or more authorized parties via a credential (e.g., a digital signature or a key identifier). The authorized party may sign the request to access the key share via a private key such that the request is identified by the online server 230, the offline server 240, or both as being associated with the authorized party. That is, the online server 230, the offline server 240, or both may verify the digital signature using the corresponding public key. In such cases, the request may be fulfilled using the CDS 205.

In some examples, the offline server 240 may implement a throughput threshold, a latency threshold, or both such that a security threat to the key share storage 245 is mitigated. For example, the offline server 240 may be associated with a throughput criteria (e.g., a maximum throughput) such that a quantity of requests may be received within a configured period of time (e.g., 200 messages per second). That is, an attacker may transmit a relatively large number of requests attempting to access one or more key shares of the key share storage. The offline server 240 may not respond to a request based on the throughput criteria being satisfied. That is, the offline server 240 may shut down and not receive or respond to request based on the throughput criteria being satisfied (e.g., a potential attack being detected).

In some examples, the offline server 240 may continue receiving requests and transmitting responses based on manual confirmation of the one or more requests exceeding the threshold. That is, a human may manually enter one or more encryption keys into the offline server 240 (e.g., via physical hardware or external media) to confirm that the relatively high amount of requests are not received via an attacker attempting to access the key share storage 245. The offline server 240 may encrypt a response to a request via a key share such that the response may be usable by an intended receiver of the response. For example, a quantity of users having respective key shares may collaborate to decrypt the response. That is, a threshold amount of the quantity of users having respective key shares (e.g., four out of 10 users) may collaborate to decrypt the response. The decrypted response may be used to sign one or more cryptographic transactions.

Figure 3:
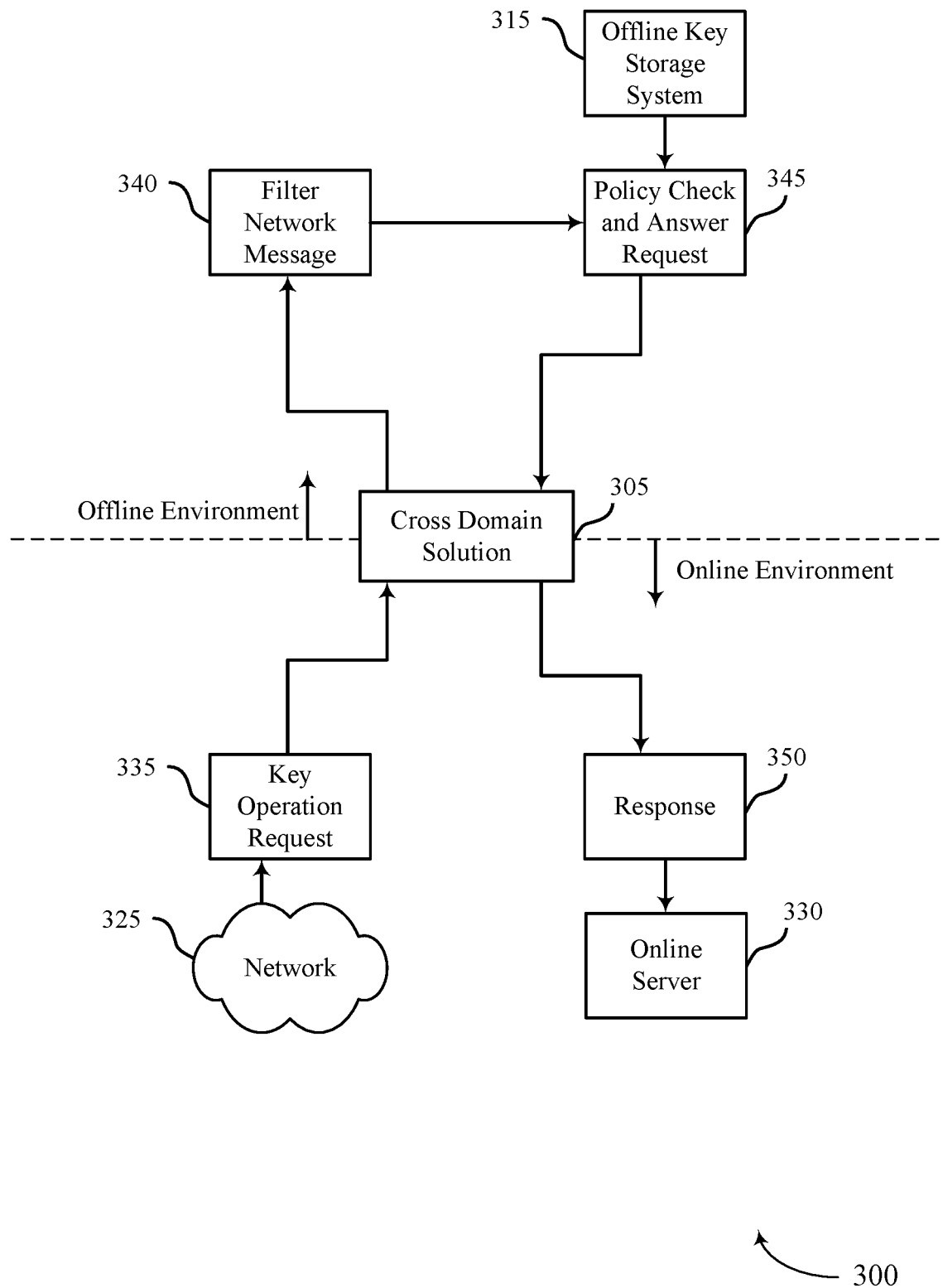
FIG. 3 shows an example of a process flow that supports cross domain key management in accordance with aspects of the present disclosure.

FIG. 3 shows an example of a process flow 300 that supports cross domain key management in accordance with aspects of the present disclosure. The process flow 300 may include a CDS 305, a network 325, an offline key storage system 315, and an online server 330. The network 325 may be an example of a network 135 as described with respect to FIG. 1, and the CDS 305, the offline key storage system 315, and the online server 330 may each be examples of corresponding devices as described with respect to FIG. 2.

In the following description of the process flow 300, the operations between the CDS 305, the network 325, the offline key storage system 315, and the online server 330 may be transmitted in a different order than the example order shown, or the operations performed may be performed in different orders or at different times. Some operations may also be omitted from the process flow 300, and other operations may be added to the process flow 300.

As described herein, the CDS 305 may be used to manage a quantity of key shares stored in the offline key storage system 315. For example, at 335, the CDS 305 may receive a key operation request via the network 325. The key operation request may include a digital signature. For example, the digital signature may be produced via a key (e.g., a private key) associated with a user or node (e.g., MPC node). In some examples, the digital signature may indicate whether the user or node associated with the key is authorized to access one or more key shares of the offline key storage system 315.

At 340, the CDS 305 may filter the network message. For example, the CDS 305 may filter the message such that some key operation requests (e.g., simple key operation requests) may pass through. That is, a request to access a key share may pass through based on the requested key share being in the offline key storage system 315. For example, a request to access a key share not in the offline key storage system 315 may be filtered (e.g., not pass through) by the CDS 305. In some examples, the request may include a key identifier associated with the requested key share. For example, the CDS 305 may determine whether the key identifier is associated with a key share of the offline key storage system 315 and filter the request accordingly.

At 345, the offline key storage system 315 may perform a policy check and answer requests. In some examples, the policy check may include verifying the digital signature included in the key operation request. For example, the offline key storage system 315 may identify that a key used to produce the digital signature is associated with a user authorized to access one or more key shares of the key storage system.

In some examples, a user may manually authorize one or more requests. For example, the user may manually input a verification of a request to the offline key storage system 315 (e.g., via an external device) based on a throughput criteria (e.g., a maximum throughput criteria) being satisfied. That is, the CDS 305 may halt receiving or processing key operation requests based on a threshold throughput being satisfied in a configured period of time, and the user may ensure that a verified request is answered by the offline key storage system 315 by manually inputting one or more encryption keys such that the request is verified by the offline key storage system 315 and a response is produced.

At 350, the online server 330 may receive a response. For example, the online server 330 may receive the response from the offline key storage system 315 via the CDS 305 after the key operation request is filtered and verified. The response may include a key share that is encrypted via an encryption key associated with the MPC node of the requested key share. In some examples, the key share may be encrypted such that it is usable by an intended receiver. That is, the key share may require one or more MPC operations to occur via users such that the key share may be used to perform a cryptographic function (e.g., used for a digital signature for a transaction).

Figure 4:
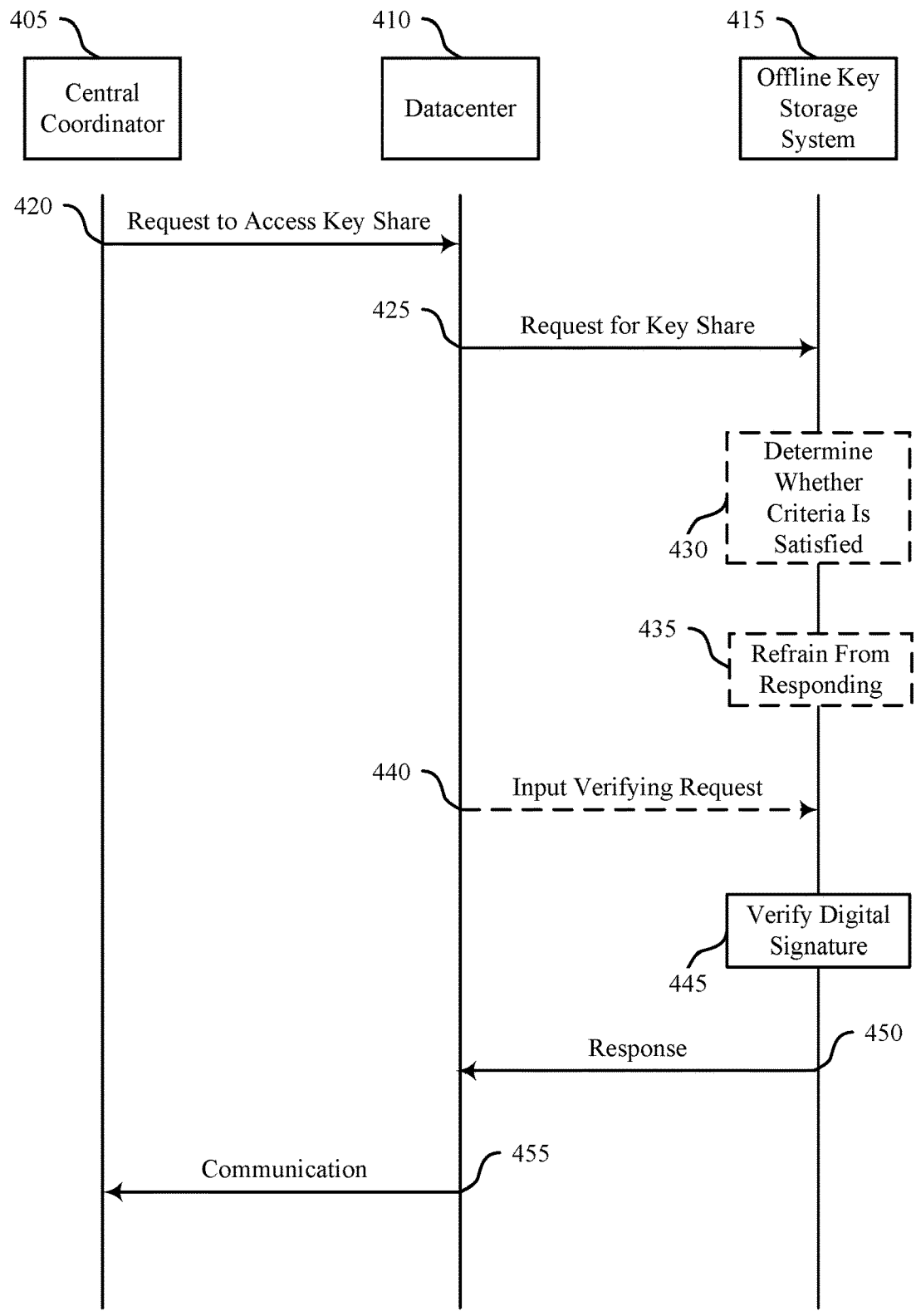
FIG. 4 shows an example of a process flow that supports cross domain key management in accordance with aspects of the present disclosure.

FIG. 4 shows an example of a process flow 400 that supports cross domain key management in accordance with aspects of the present disclosure. The process flow 400 may include a central coordinator 405, a datacenter 410, and an offline key storage system 415. The central coordinator 405 and the datacenter 410 may be examples of aspects of the central coordinator 220 and aspects of the datacenter 215 as described with respect to FIG. 2, and the offline key storage system 415 may be an example of the offline key storage system 315 as described with respect to FIG. 3, the offline server 240 of FIG. 2, and/or the key share storage 245 of FIG. 2.

In the following description of the process flow 400, the operations between the central coordinator 405, the datacenter 410, and the offline key storage system 415 may be transmitted in a different order than the example order shown, or the operations performed may be performed in different orders or at different times. Some operations may also be omitted from the process flow 400, and other operations may be added to the process flow 400.

At 420, the central coordinator 405 may transmit a request to access a key share to the datacenter 410. The request may include a digital signature, a key identifier associated with the key share, or both. In some examples, the datacenter 410 may receive the request via a server (e.g., an online server). Additionally, or alternatively, the key share may be associated with an MPC node. The key share may be one of a quantity of key shares used to perform a cryptographic operation using an MPC function. For example, the cryptographic operation may include a digital signing of a transaction that is to be broadcast via a blockchain network. In some examples, the transaction may be configured to cause transfer of one or more crypto tokens from a first wallet address associated with the key share to a second wallet address.

At 425, the datacenter 410 may transmit a request for the key share to the offline key storage system 415. For example, the request may be transmitted via a first cross domain path (e.g., of a CDS). The cross domain path may be a fiber-optic communication path coupled between the server and the offline key storage system 415. In some examples, the fiber-optic communication path may include one or more data diode components. The request may include the digital signature, the key identifier associated with the key share, or both.

At 430, the offline key storage system 415 may determine whether a criteria is satisfied. In some examples, the criteria may be a maximum throughput criteria. For example, the offline key storage system 415 may determine whether the request and one or more other requests received from the datacenter 410 satisfies the maximum throughput criteria within a configured period of time. In some examples, the maximum throughput criteria may be configured to prevent an attacker from overwhelming an offline system to access one or more key shares of the offline key storage system 415.

At 435, the offline key storage system 415 may refrain from responding. For example, the offline key storage system 415 may refrain from responding based on the criteria being satisfied (e.g., at 430). That is, the offline key storage system 415 may halt based on the maximum throughput being met. The offline key storage system 415 may halt such that an attacker attempting to overwhelm the offline system may not transmit requests to access the offline key storage system 415.

At 440, the datacenter 410 may transmit an input verifying a request to the offline key storage system 415. For example, the input may allow the offline system to respond to a request after the system has been halted due to the maximum throughput criteria being met. The input may verify that a request (e.g., a request exceeding the maximum throughput criteria) is from an authorized user.

At 445, the offline key storage system 415 may verify a digital signature. For example, the offline key storage system 415 may verify the digital signature included in the request for the key share received from the datacenter 410.

At 450, the offline key storage system 415 may transmit a response to the datacenter 410 (e.g., an online server of the datacenter). The response may include a key share that is encrypted using an encryption key associated with the MPC node. For example, the key share may be encrypted such that it is usable by an intended receiver. The response may be transmitted via a cross domain path. The cross domain path may be a fiber-optic communication path coupled between the offline key storage system 415 and the server. In some examples, the fiber-optic communication path may include one or more data diode components.

At 455, the datacenter 410 may transmit a communication to the central coordinator 405. For example, the communication may include the encrypted key share. In some examples, the encrypted key share may be used in the cryptographic operation, including a digital signing of a transaction that is to be broadcast via a blockchain network. For example, the transaction may be configured to cause transfer of one or more crypto tokens from a first wallet address associate with the key share to a second wallet address.

Figure 5:
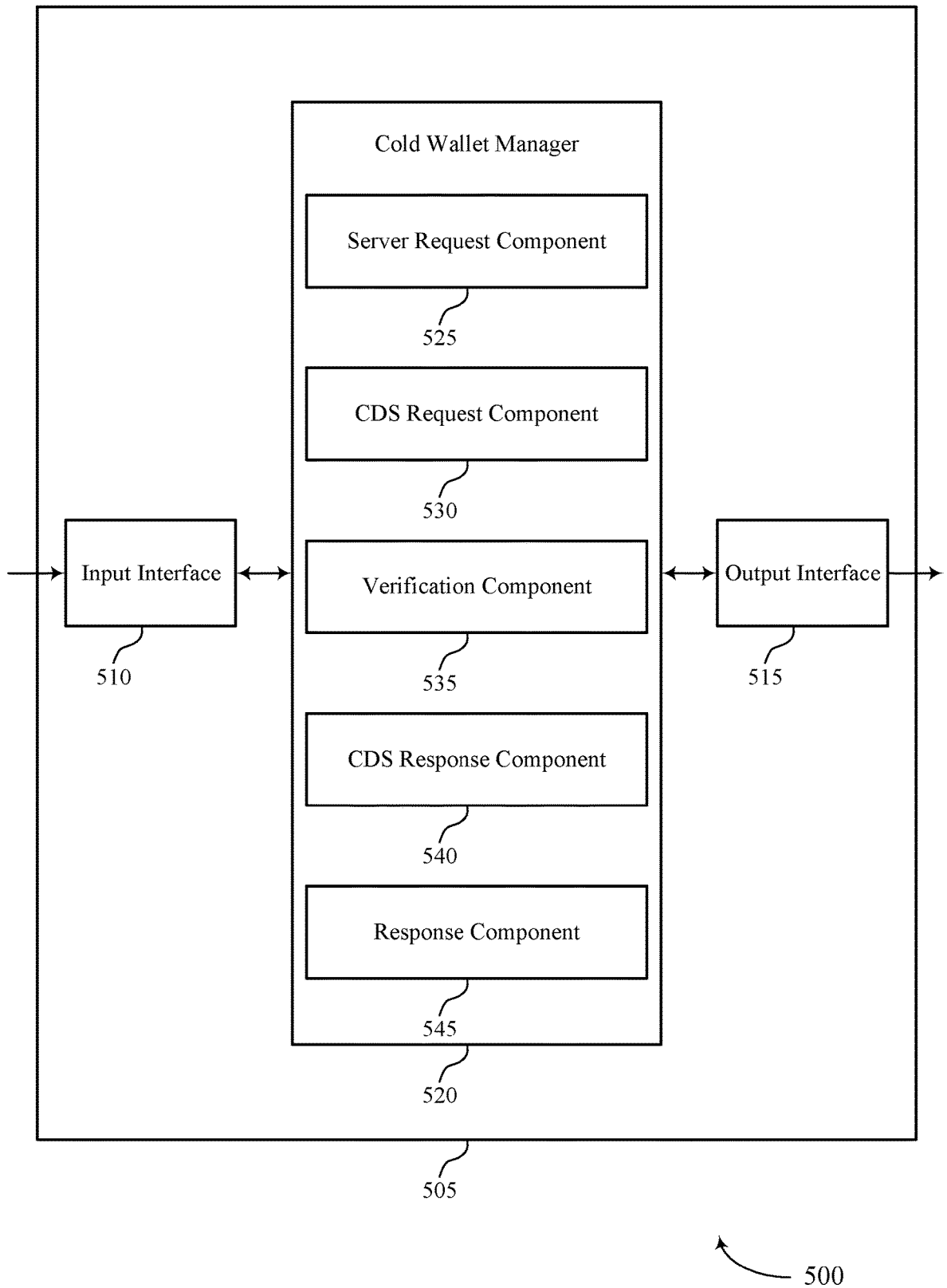
FIG. 5 shows a block diagram of an apparatus that supports cross domain key management in accordance with aspects of the present disclosure.

FIG. 5 shows a block diagram 500 of a system 505 that supports cross domain key management in accordance with aspects of the present disclosure. The system 505 may include an input interface 510, an output interface 515, and a cold wallet manager 520. The system 505, or one or more components of the system 505 (e.g., the input interface 510, the output interface 515, and the cold wallet manager 520), may include at least one processor, which may be coupled with at least one memory, to support the described techniques. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, transactions, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the cold wallet manager 520 to support cross domain key management. In some cases, the input interface 510 may be a component of a network interface 725 as described with reference to FIG. 7.

The output interface 515 may manage output signaling for the system 505. For example, the output interface 515 may receive signaling from other components of the system 505, such as the cold wallet manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the cold wallet manager 520 may include a server request component 525, a CDS request component 530, a verification component 535, a CDS response component 540, a response component 545, or any combination thereof. In some examples, the cold wallet manager 520, or various components thereof, may be configured to perform various operations (e.g., receiving, monitoring, transmitting) using or otherwise in cooperation with the input interface 510, the output interface 515, or both. For example, the cold wallet manager 520 may receive information from the input interface 510, send information to the output interface 515, or be integrated in combination with the input interface 510, the output interface 515, or both to receive information, transmit information, or perform various other operations as described herein.

The cold wallet manager 520 may support key management in accordance with examples as disclosed herein. The server request component 525 may be configured as or otherwise support a means for receiving, via a server and from a multi-party computation (MPC) coordinator, a first request to access a key share associated with an MPC node. The CDS request component 530 may be configured as or otherwise support a means for transmitting, via a first cross domain communication path and to an offline key storage system, a second request for the key share associated with the MPC node. The verification component 535 may be configured as or otherwise support a means for verifying, at the offline key storage system, a digital signature included with the second request. The CDS response component 540 may be configured as or otherwise support a means for transmitting, to the server via a second cross domain communication path after verifying the digital signature, a response that includes the key share that is encrypted using an encryption key associated with the MPC node. The response component 545 may be configured as or otherwise support a means for transmitting, to the MPC coordinator, a communication including the encrypted key share.

Figure 6:
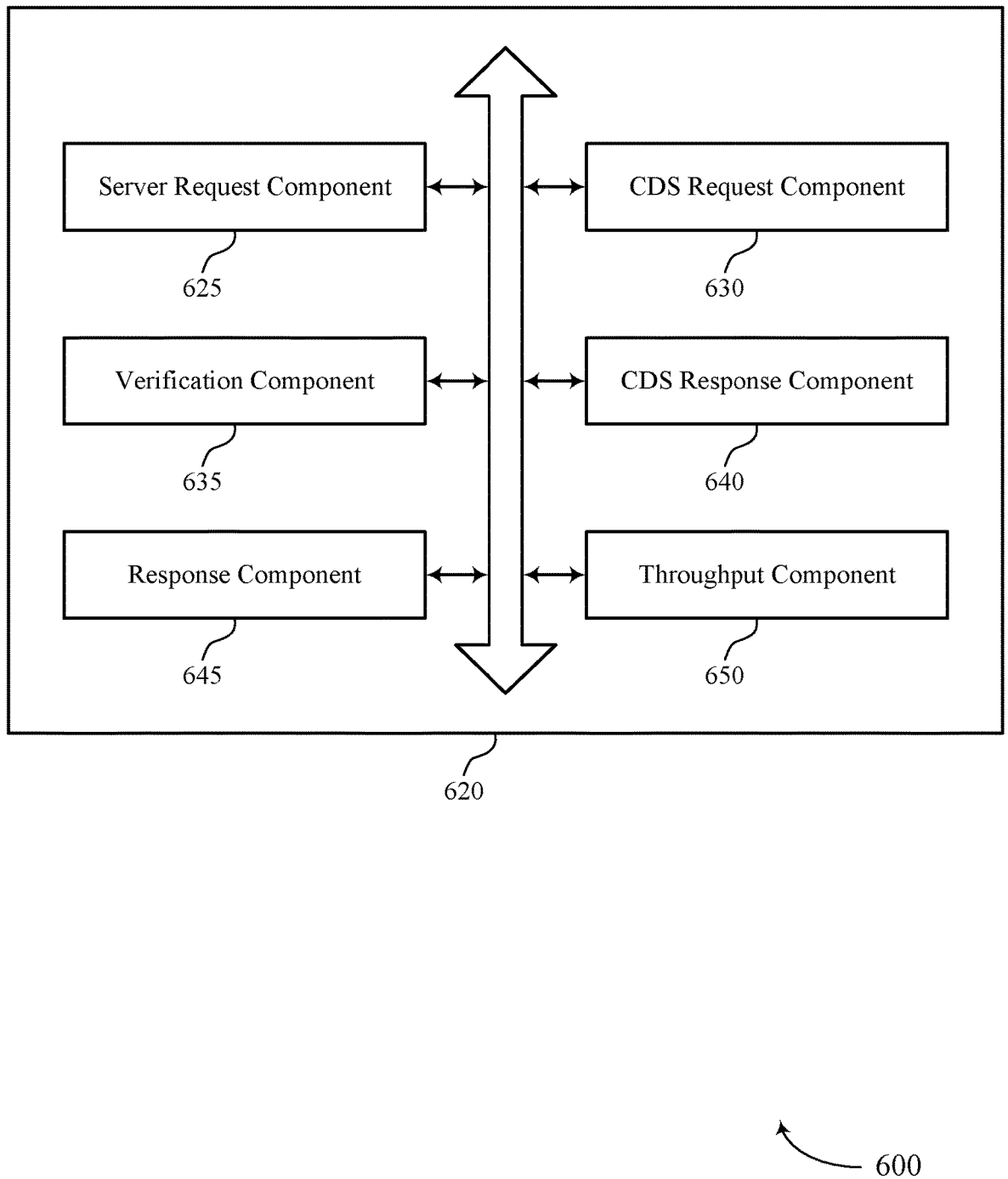
FIG. 6 shows a block diagram of a cold wallet manager that supports cross domain key management in accordance with aspects of the present disclosure.

FIG. 6 shows a block diagram 600 of a cold wallet manager 620 that supports cross domain key management in accordance with aspects of the present disclosure. The cold wallet manager 620 may be an example of aspects of a cold wallet manager 520, as described herein. The cold wallet manager 620, or various components thereof, may be an example of means for performing various aspects of cross domain key management as described herein. For example, the cold wallet manager 620 may include a server request component 625, a CDS request component 630, a verification component 635, a CDS response component 640, a response component 645, a throughput component 650, or any combination thereof. Each of these components, or components of subcomponents thereof (e.g., one or more processors, one or more memories), may communicate, directly or indirectly, with one another (e.g., e.g., via one or more buses, communications links, communications interfaces, or any combination thereof).).

The cold wallet manager 620 may support key management in accordance with examples as disclosed herein. The server request component 625 may be configured as or otherwise support a means for receiving, via a server and from a multi-party computation (MPC) coordinator, a first request to access a key share associated with an MPC node. The CDS request component 630 may be configured as or otherwise support a means for transmitting, via a first cross domain communication path and to an offline key storage system, a second request for the key share associated with the MPC node. The verification component 635 may be configured as or otherwise support a means for verifying, at the offline key storage system, a digital signature included with the second request. The CDS response component 640 may be configured as or otherwise support a means for transmitting, to the server via a second cross domain communication path after verifying the digital signature, a response that includes the key share that is encrypted using an encryption key associated with the MPC node. The response component 645 may be configured as or otherwise support a means for transmitting, to the MPC coordinator, a communication including the encrypted key share.

In some examples, the throughput component 650 may be configured as or otherwise support a means for determining, at the offline key storage system, whether a maximum throughput criteria is satisfied by the second request and one or more other requests received by the offline key storage system within a configured period of time.

In some examples, the throughput component 650 may be configured as or otherwise support a means for refraining from responding to at least one request received at the offline key storage system based at least in part on the maximum throughput criteria being satisfied.

In some examples, the verification component 635 may be configured as or otherwise support a means for receiving, at the offline key storage system after determining that the maximum throughput criteria is satisfied, an input verifying at least one request. In some examples, the CDS response component 640 may be configured as or otherwise support a means for transmitting, to the server via the second cross domain communication path after receiving the input, a response to the at least one request.

In some examples, the key share is one of a plurality of key shares used to perform a cryptographic operation using an MPC function.

In some examples, the cryptographic operation comprises a digital signing of a transaction that is to be broadcast via a blockchain network.

In some examples, the transaction is configured to cause transfer of one or more crypto tokens from a first wallet address associated with the key share to a second wallet address.

In some examples, the first request comprises the digital signature that is included in the second request.

In some examples, to support receiving the first request, the server request component 625 may be configured as or otherwise support a means for receiving the first request that includes a key identifier associated with the key share.

In some examples, the second request is transmitted via a first fiber-optic communication path coupled between the server and the offline key storage system, and the response is transmitted via a second fiber-optic communication path coupled between the offline key storage system and the server.

In some examples, the first fiber-optic communication path and the second fiber-optic communication path comprises one or more data diode components.

In some examples, the offline key storage system stores a plurality of key shares.

Figure 7:
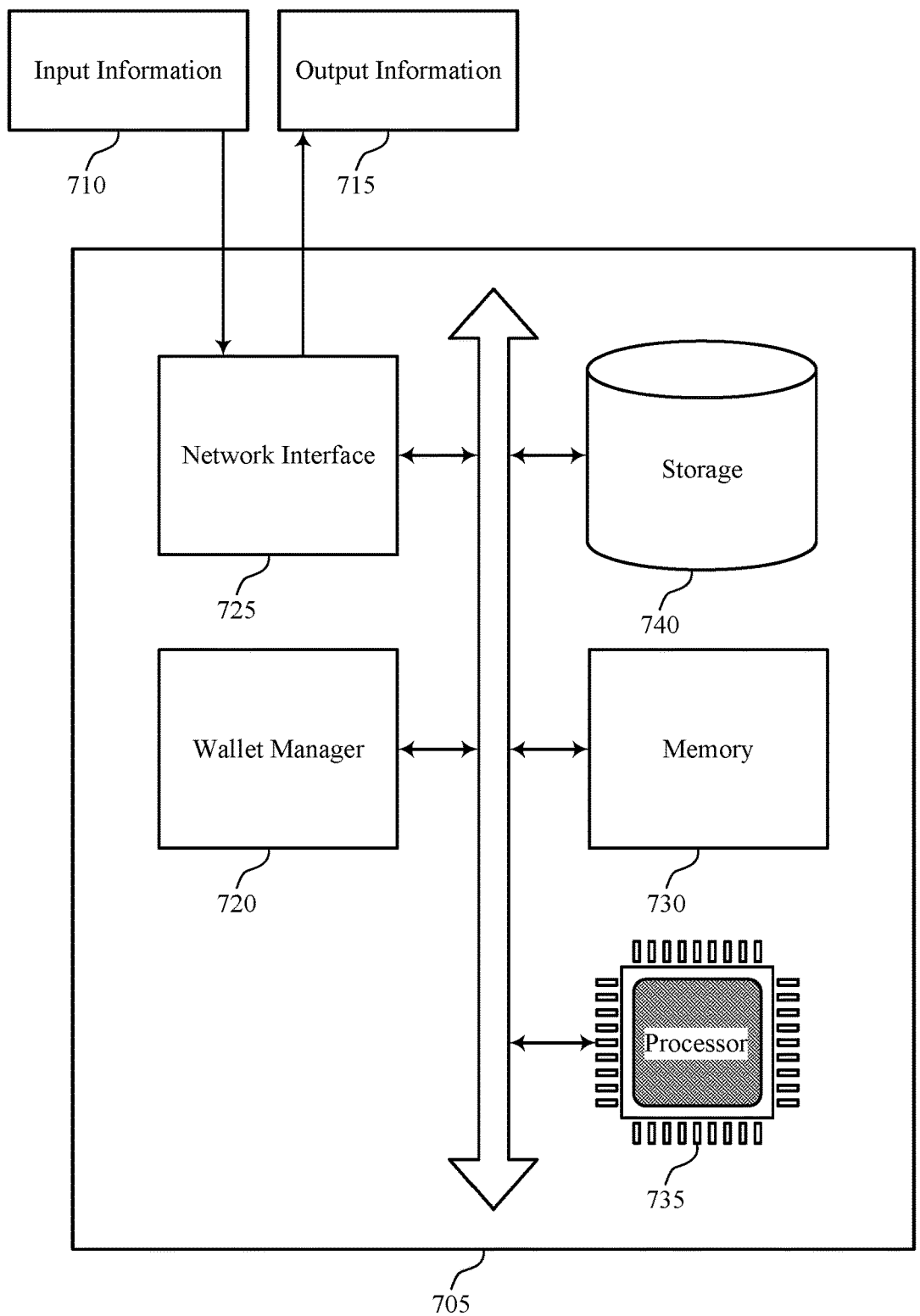
FIG. 7 shows a diagram of a system including a device that supports cross domain key management in accordance with aspects of the present disclosure.

FIG. 7 shows a diagram of a system 700 including a system 705 that supports cross domain key management in accordance with aspects of the present disclosure. The system 705 may be an example of or include the components of a system 505 as described herein. The system 705 may be an example of one or more servers as described herein. The system 705 may include components for key management, transaction management, blockchain communication, and the like, including devices or components such as a wallet manager 720, an input information 710, an output information 715, a network interface 725, at least one memory 730, at least one processor 735, and a storage 740. Each of these components may communicate, directly or indirectly, with one another (e.g., via one or more buses, communications links, communications interfaces, or any combination thereof).

The network interface 725 may enable the system 705 to exchange information (e.g., input information 710, output information 715, or both) with other systems or devices (not shown). For example, the network interface 725 may enable the system 705 to connect to a network (e.g., a network 135 as described herein). The network interface 725 may include one or more wireless network interfaces, one or more wired network interfaces, or any combination thereof.

Memory 730 may include RAM, ROM, or both. The memory 730 may store computer-readable, computer-executable software including instructions that, when executed, cause at least one processor 735 to perform various functions described herein, such as functions supporting cross domain key management. In some cases, the memory 730 may contain, among other things, a basic input/output system (BIOS), which may control basic hardware or software operation such as the interaction with peripheral components or devices. In some cases, the memory 730 may be an example of aspects of one or more components of a custodial token platform 110 as described with reference to FIG. 1. The memory 730 may be an example of a single memory or multiple memories. For example, the system 705 may include one or more memories 730.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in at least one memory 730 to perform various functions (e.g., functions or tasks supporting cross domain key management). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. The processor 735 may be an example of a single processor or multiple processors. For example, the system 705 may include one or more processors 735.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database.

The wallet manager 720 may support key management in accordance with examples as disclosed herein. For example, the wallet manager 720 may be configured as or otherwise support a means for receiving, via a server and from a multi-party computation (MPC) coordinator, a first request to access a key share associated with an MPC node. The wallet manager 720 may be configured as or otherwise support a means for transmitting, via a first cross domain communication path and to an offline key storage system, a second request for the key share associated with the MPC node. The wallet manager 720 may be configured as or otherwise support a means for verifying, at the offline key storage system, a digital signature including with the second request. The wallet manager 720 may be configured as or otherwise support a means for transmitting, to the server via a second cross domain communication path after verifying the digital signature, a response that includes the key share that is encrypted using an encryption key associated with the MPC node. The wallet manager 720 may be configured as or otherwise support a means for transmitting, to the MPC coordinator, a communication including the encrypted key share.

By including or configuring the wallet manager 720 in accordance with examples as described herein, the system 705 may support techniques for more secure key management. In some examples, these techniques improve key management for blockchain protocol communications transactions.

Figure 8:
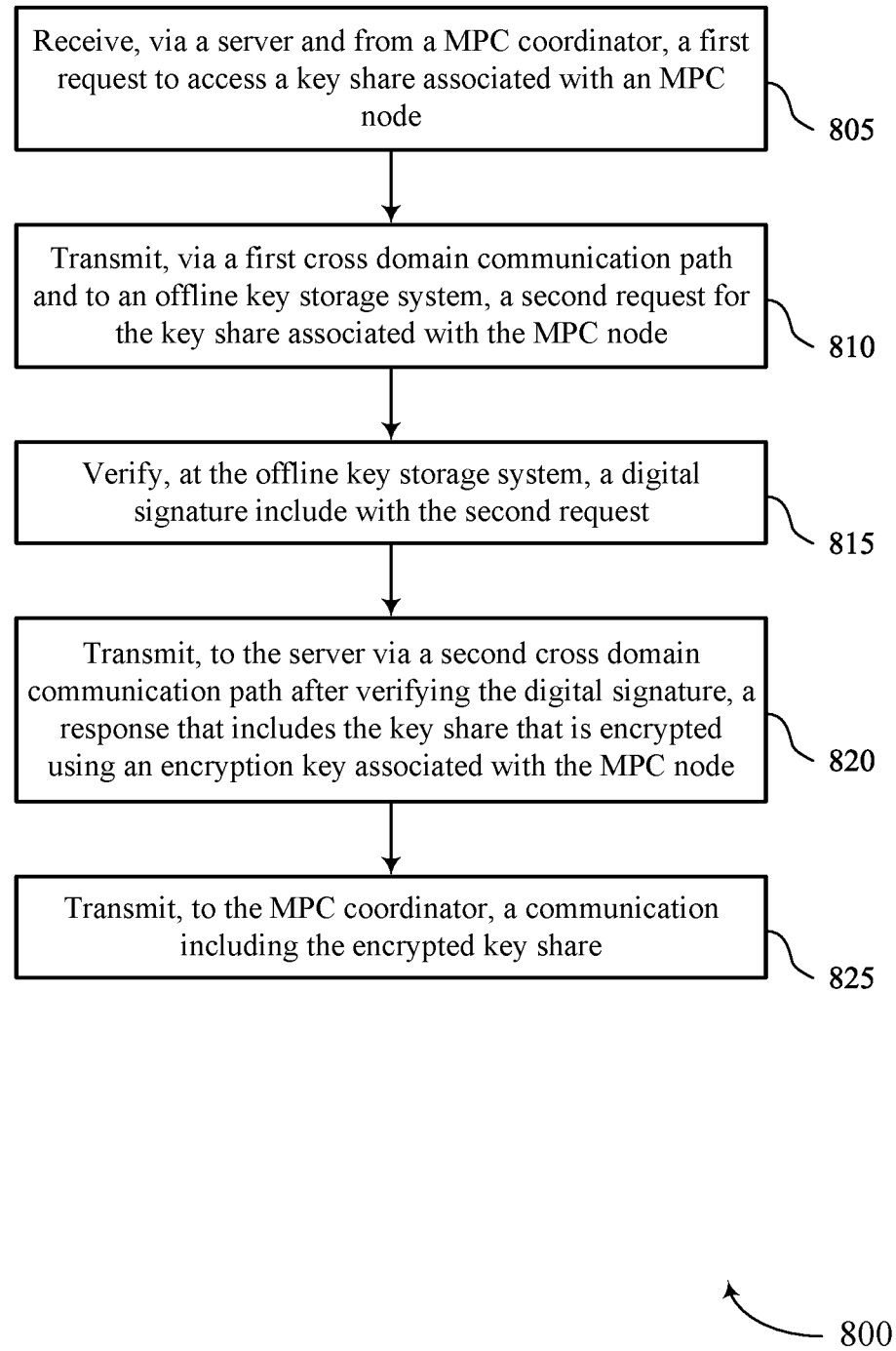
FIGS. 8 and 9 show flowcharts illustrating methods that support cross domain key management in accordance with aspects of the present disclosure.

FIG. 8 shows a flowchart illustrating a method 800 that supports cross domain key management in accordance with aspects of the present disclosure. The operations of the method 800 may be implemented by a datacenter or its components as described herein. For example, the operations of the method 800 may be performed by a datacenter as described with reference to FIGS. 1 through 7. In some examples, a datacenter may execute a set of instructions to control the functional elements of the datacenter to perform the described functions. Additionally, or alternatively, the datacenter may perform aspects of the described functions using special-purpose hardware.

At 805, the method may include receiving, via a server and from a multi-party computation (MPC) coordinator, a first request to access a key share associated with an MPC node. The operations of block 805 may be performed in accordance with examples as disclosed herein. In some examples, aspects of the operations of 805 may be performed by a server request component 625 as described with reference to FIG. 6.

At 810, the method may include transmitting, via a first cross domain communication path and to an offline key storage system, a second request for the key share associated with the MPC node. The operations of block 810 may be performed in accordance with examples as disclosed herein. In some examples, aspects of the operations of 810 may be performed by a CDS request component 630 as described with reference to FIG. 6.

At 815, the method may include verifying, at the offline key storage system, a digital signature included with the second request. The operations of block 815 may be performed in accordance with examples as disclosed herein. In some examples, aspects of the operations of 815 may be performed by a verification component 635 as described with reference to FIG. 6.

At 820, the method may include transmitting, to the server via a second cross domain communication path after verifying the digital signature, a response that includes the key share that is encrypted using an encryption key associated with the MPC node. The operations of block 820 may be performed in accordance with examples as disclosed herein. In some examples, aspects of the operations of 820 may be performed by a CDS response component 640 as described with reference to FIG. 6.

At 825, the method may include transmitting, to the MPC coordinator, a communication including the encrypted key share. The operations of block 825 may be performed in accordance with examples as disclosed herein. In some examples, aspects of the operations of 825 may be performed by a response component 645 as described with reference to FIG. 6.

Figure 9:
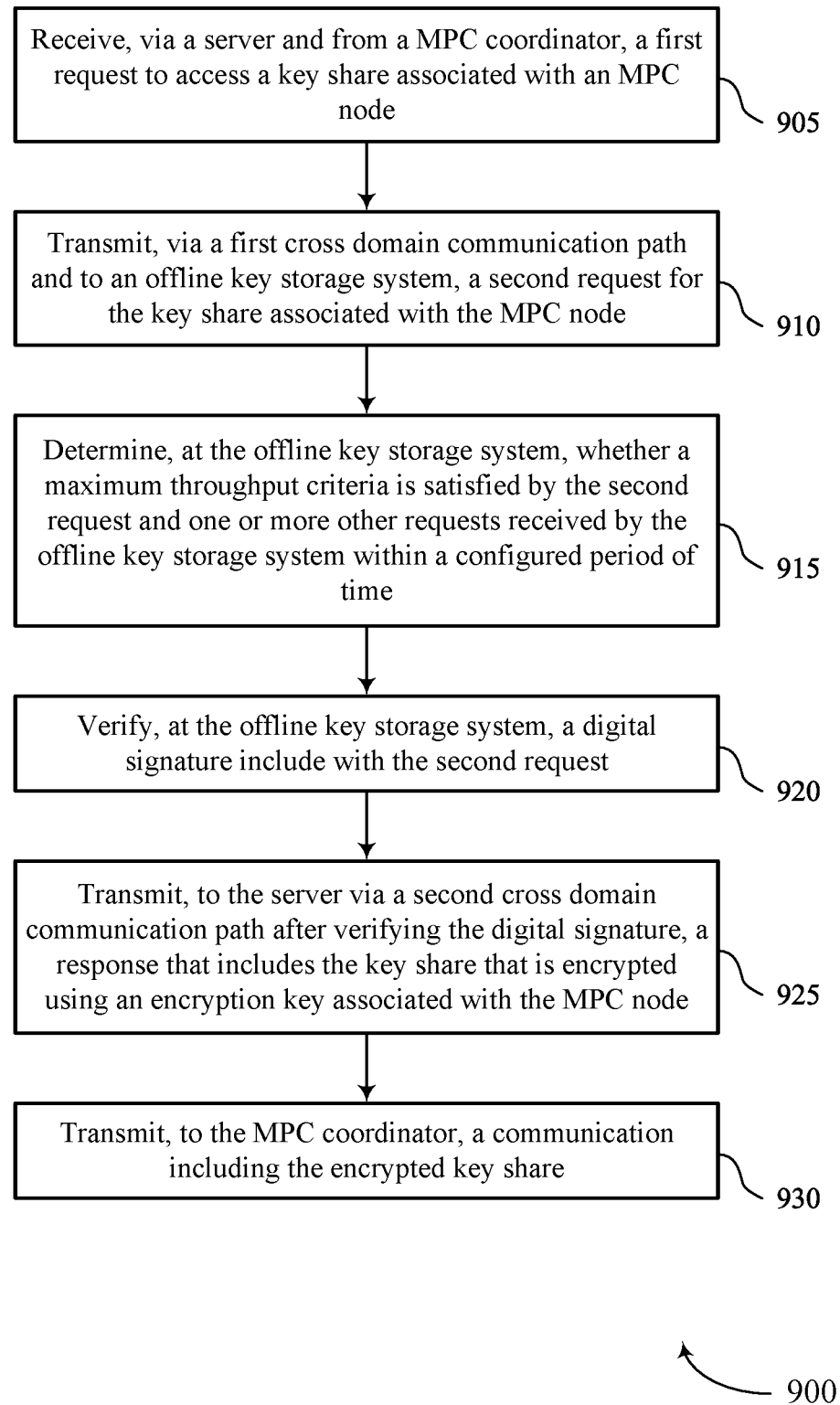

FIG. 9 shows a flowchart illustrating a method 900 that supports cross domain key management in accordance with aspects of the present disclosure. The operations of the method 900 may be implemented by a datacenter or its components as described herein. For example, the operations of the method 900 may be performed by a datacenter as described with reference to FIGS. 1 through 7. In some examples, a datacenter may execute a set of instructions to control the functional elements of the datacenter to perform the described functions. Additionally, or alternatively, the datacenter may perform aspects of the described functions using special-purpose hardware.

At 905, the method may include receiving, via a server and from a multi-party computation (MPC) coordinator, a first request to access a key share associated with an MPC node. The operations of block 905 may be performed in accordance with examples as disclosed herein. In some examples, aspects of the operations of 905 may be performed by a server request component 625 as described with reference to FIG. 6.

At 910, the method may include transmitting, via a first cross domain communication path and to an offline key storage system, a second request for the key share associated with the MPC node. The operations of block 910 may be performed in accordance with examples as disclosed herein. In some examples, aspects of the operations of 910 may be performed by a CDS request component 630 as described with reference to FIG. 6.

At 915, the method may include determining, at the offline key storage system, whether a maximum throughput criteria is satisfied by the second request and one or more other requests received by the offline key storage system within a configured period of time. The operations of block 915 may be performed in accordance with examples as disclosed herein. In some examples, aspects of the operations of 915 may be performed by a throughput component 650 as described with reference to FIG. 6.

At 920, the method may include verifying, at the offline key storage system, a digital signature included with the second request. The operations of block 920 may be performed in accordance with examples as disclosed herein. In some examples, aspects of the operations of 920 may be performed by a verification component 635 as described with reference to FIG. 6.

At 925, the method may include transmitting, to the server via a second cross domain communication path after verifying the digital signature, a response that includes the key share that is encrypted using an encryption key associated with the MPC node. The operations of block 925 may be performed in accordance with examples as disclosed herein. In some examples, aspects of the operations of 925 may be performed by a CDS response component 640 as described with reference to FIG. 6.

At 930, the method may include transmitting, to the MPC coordinator, a communication including the encrypted key share. The operations of block 930 may be performed in accordance with examples as disclosed herein. In some examples, aspects of the operations of 930 may be performed by a response component 645 as described with reference to FIG. 6.

A method for key management by an apparatus is described. The method may include receiving, via a server and from a MPC coordinator, a first request to access a key share associated with an MPC node, transmitting, via a first cross domain communication path and to an offline key storage system, a second request for the key share associated with the MPC node, verifying, at the offline key storage system, a digital signature included with the second request, transmitting, to the server via a second cross domain communication path after verifying the digital signature, a response that includes the key share that is encrypted using an encryption key associated with the MPC node, and transmitting, to the MPC coordinator, a communication including the encrypted key share.

An apparatus for key management is described. The apparatus may include one or more memories storing processor executable code, and one or more processors coupled with the one or more memories. The one or more processors may individually or collectively operable to execute the code to cause the apparatus to receive, via a server and from a MPC coordinator, a first request to access a key share associated with an MPC node, transmit, via a first cross domain communication path and to an offline key storage system, a second request for the key share associated with the MPC node, verify, at the offline key storage system, a digital signature include with the second request, transmit, to the server via a second cross domain communication path after verifying the digital signature, a response that includes the key share that is encrypted using an encryption key associated with the MPC node, and transmit, to the MPC coordinator, a communication including the encrypted key share.

Another apparatus for key management is described. The apparatus may include means for receiving, via a server and from a MPC coordinator, a first request to access a key share associated with an MPC node, means for transmitting, via a first cross domain communication path and to an offline key storage system, a second request for the key share associated with the MPC node, means for verifying, at the offline key storage system, a digital signature included with the second request, means for transmitting, to the server via a second cross domain communication path after verifying the digital signature, a response that includes the key share that is encrypted using an encryption key associated with the MPC node, and means for transmitting, to the MPC coordinator, a communication including the encrypted key share.

A non-transitory computer-readable medium storing code for key management is described. The code may include instructions executable by a processor to receive, via a server and from a MPC coordinator, a first request to access a key share associated with an MPC node, transmit, via a first cross domain communication path and to an offline key storage system, a second request for the key share associated with the MPC node, verify, at the offline key storage system, a digital signature include with the second request, transmit, to the server via a second cross domain communication path after verifying the digital signature, a response that includes the key share that is encrypted using an encryption key associated with the MPC node, and transmit, to the MPC coordinator, a communication including the encrypted key share.

Some examples of the method, apparatus, and non-transitory computer-readable medium described herein may further include operations, features, means, or instructions for determining, at the offline key storage system, whether a maximum throughput criteria may be satisfied by the second request and one or more other requests received by the offline key storage system within a configured period of time.

Some examples of the method, apparatus, and non-transitory computer-readable medium described herein may further include operations, features, means, or instructions for refraining from responding to at least one request received at the offline key storage system based at least in part on the maximum throughput criteria being satisfied.

Some examples of the method, apparatus, and non-transitory computer-readable medium described herein may further include operations, features, means, or instructions for receiving, at the offline key storage system after determining that the maximum throughput criteria may be satisfied, an input verifying at least one request and transmitting, to the server via the second cross domain communication path after receiving the input, a response to the at least one request.

In some examples of the method, apparatus, and non-transitory computer-readable medium described herein, the key share may be one of a plurality of key shares used to perform a cryptographic operation using an MPC function.

In some examples of the method, apparatus, and non-transitory computer-readable medium described herein, the cryptographic operation comprises a digital signing of a transaction that may be broadcast via a blockchain network.

In some examples of the method, apparatus, and non-transitory computer-readable medium described herein, the transaction may be configured to cause transfer of one or more crypto tokens from a first wallet address associated with the key share to a second wallet address.

In some examples of the method, apparatus, and non-transitory computer-readable medium described herein, the first request comprises the digital signature that may be included in the second request.

In some examples of the method, apparatus, and non-transitory computer-readable medium described herein, receiving the first request may include operations, features, means, or instructions for receiving the first request that includes a key identifier associated with the key share.

In some examples of the method, apparatus, and non-transitory computer-readable medium described herein, the second request may be transmitted via a first fiber-optic communication path coupled between the server and the offline key storage system, and the response may be transmitted via a second fiber-optic communication path coupled between the offline key storage system and the server.

In some examples of the method, apparatus, and non-transitory computer-readable medium described herein, the first fiber-optic communication path and the second fiber-optic communication path comprises one or more data diode components.

In some examples of the method, apparatus, and non-transitory computer-readable medium described herein, the offline key storage system stores a plurality of key shares.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method for key management, comprising:
   receiving, via a server and from a multi-party computation (MPC) coordinator, a first request to access a key share associated with an MPC node;
   transmitting, via a first cross domain communication path and to an offline key storage system, a second request for the key share associated with the MPC node;
   verifying, at the offline key storage system, a digital signature included with the second request;
   transmitting, to the server via a second cross domain communication path after verifying the digital signature, a response that includes the key share that is encrypted using an encryption key associated with the MPC node; and
   transmitting, to the MPC coordinator, a communication including the encrypted key share.

2. The method of claim 1, further comprising:
   determining, at the offline key storage system, whether a maximum throughput criteria is satisfied by the second request and one or more other requests received by the offline key storage system within a configured period of time.

3. The method of claim 2, further comprising:
   refraining from responding to at least one request received at the offline key storage system based at least in part on the maximum throughput criteria being satisfied.

4. The method of claim 2, further comprising:
   receiving, at the offline key storage system after determining that the maximum throughput criteria is satisfied, an input verifying at least one request; and
   transmitting, to the server via the second cross domain communication path after receiving the input, a response to the at least one request.

5. The method of claim 1, wherein the key share is one of a plurality of key shares used to perform a cryptographic operation using an MPC function.

6. The method of claim 5, wherein the cryptographic operation comprises a digital signing of a transaction that is to be broadcast via a blockchain network.

7. The method of claim 6, wherein the transaction is configured to cause transfer of one or more crypto tokens from a first wallet address associated with the key share to a second wallet address.

8. The method of claim 1, wherein the first request comprises the digital signature that is included in the second request.

9. The method of claim 1, wherein receiving the first request comprises:
   receiving the first request that includes a key identifier associated with the key share.

10. The method of claim 1, wherein the second request is transmitted via a first fiber-optic communication path coupled between the server and the offline key storage system, and the response is transmitted via a second fiber-optic communication path coupled between the offline key storage system and the server.

11. The method of claim 10, wherein the first fiber-optic communication path and the second fiber-optic communication path comprises one or more data diode components.

12. The method of claim 1, wherein the offline key storage system stores a plurality of key shares.

13. An apparatus for key management, comprising:
one or more memories storing processor-executable code; and
one or more processors coupled with the one or more memories and individually or collectively operable to execute the code to cause the apparatus to:
receive, via a server and from a multi-party computation (MPC) coordinator, a first request to access a key share associated with an MPC node;
transmit, via a first cross domain communication path and to an offline key storage system, a second request for the key share associated with the MPC node;
verify, at the offline key storage system, a digital signature include with the second request;
transmit, to the server via a second cross domain communication path after verifying the digital signature, a response that includes the key share that is encrypted using an encryption key associated with the MPC node; and
transmit, to the MPC coordinator, a communication including the encrypted key share.

14. The apparatus of claim 13, wherein the one or more processors are individually or collectively further operable to execute the code to cause the apparatus to:
determine, at the offline key storage system, whether a maximum throughput criteria is satisfied by the second request and one or more other requests received by the offline key storage system within a configured period of time.

15. The apparatus of claim 14, wherein the one or more processors are individually or collectively further operable to execute the code to cause the apparatus to:
refrain from responding to at least one request received at the offline key storage system based at least in part on the maximum throughput criteria being satisfied.

16. The apparatus of claim 14, wherein the one or more processors are individually or collectively further operable to execute the code to cause the apparatus to:
receive, at the offline key storage system after determining that the maximum throughput criteria is satisfied, an input verifying at least one request; and
transmit, to the server via the second cross domain communication path after receiving the input, a response to the at least one request.

17. The apparatus of claim 13, wherein the key share is one of a plurality of key shares used to perform a cryptographic operation using an MPC function.

18. The apparatus of claim 17, wherein the cryptographic operation comprises a digital signing of a transaction that is to be broadcast via a blockchain network.

19. A non-transitory computer-readable medium storing code for key management, the code comprising instructions executable by one or more processors to:
receive, via a server and from a multi-party computation (MPC) coordinator, a first request to access a key share associated with an MPC node;
transmit, via a first cross domain communication path and to an offline key storage system, a second request for the key share associated with the MPC node;
verify, at the offline key storage system, a digital signature include with the second request;
transmit, to the server via a second cross domain communication path after verifying the digital signature, a response that includes the key share that is encrypted using an encryption key associated with the MPC node; and
transmit, to the MPC coordinator, a communication including the encrypted key share.

20. The non-transitory computer-readable medium of claim 19, wherein the instructions are further executable by the one or more processors to:
determine, at the offline key storage system, whether a maximum throughput criteria is satisfied by the second request and one or more other requests received by the offline key storage system within a configured period of time.

* * * * *